United States Patent [19]

Valente

[11] Patent Number: 5,671,640

[45] Date of Patent: Sep. 30, 1997

[54] LOCKING DIFFERENTIAL WITH PRE-LOAD MEANS AND C-CLIP RETAINERS

[75] Inventor: Paul J. Valente, Berkley, Mich.

[73] Assignee: Tractech Inc., Warren, Mich.

[21] Appl. No.: 641,355

[22] Filed: Apr. 30, 1996

[51] Int. Cl.$^6$ ............................................. F16H 48/14
[52] U.S. Cl. ................................................ 74/650; 475/220
[58] Field of Search ........................ 74/650, 665 F, 74/665 G; 475/220

[56] References Cited

U.S. PATENT DOCUMENTS

| | | | |
|---|---|---|---|
| 3,359,803 | 12/1967 | Long | 74/650 |
| 3,791,238 | 2/1974 | Bokovoy | 74/650 |
| 4,513,633 | 4/1985 | Goscenski, Jr. | 74/650 |
| 4,557,158 | 12/1985 | Dissett et al. | 74/650 |
| 4,644,818 | 2/1987 | Choma et al. | 74/650 |
| 4,745,818 | 5/1988 | Edwards et al. | 74/650 |
| 5,221,238 | 6/1993 | Bawks et al. | 475/248 |
| 5,524,509 | 6/1996 | Dissett | 74/650 |
| 5,590,572 | 1/1997 | Valente | 74/650 |

FOREIGN PATENT DOCUMENTS

| | | | |
|---|---|---|---|
| 522746 | 3/1956 | Canada | 74/650 |
| 1384602 | 11/1964 | France | 74/650 |

Primary Examiner—Khoi Q. Ta
Attorney, Agent, or Firm—Laubscher & Laubscher

[57] ABSTRACT

An automatic locking differential of the type having C-clip retainers adapted for mounting in peripheral grooves contained in the adjacent ends of the output shafts includes an annular center driver gear, a center cam member arranged concentrically within the center driver gear, and at least one resilient preload member for biasing a pair of side gears into engagement with an internal annular shoulder on the center cam member, thereby to dampen the rotational play between the center cam and the center driver member. A pair of preload resilient members may be provided at the remote ends of the side gears for axially biasing the side gears together toward engagement with the internal diameter on the center cam member.

8 Claims, 5 Drawing Sheets

FIG. I
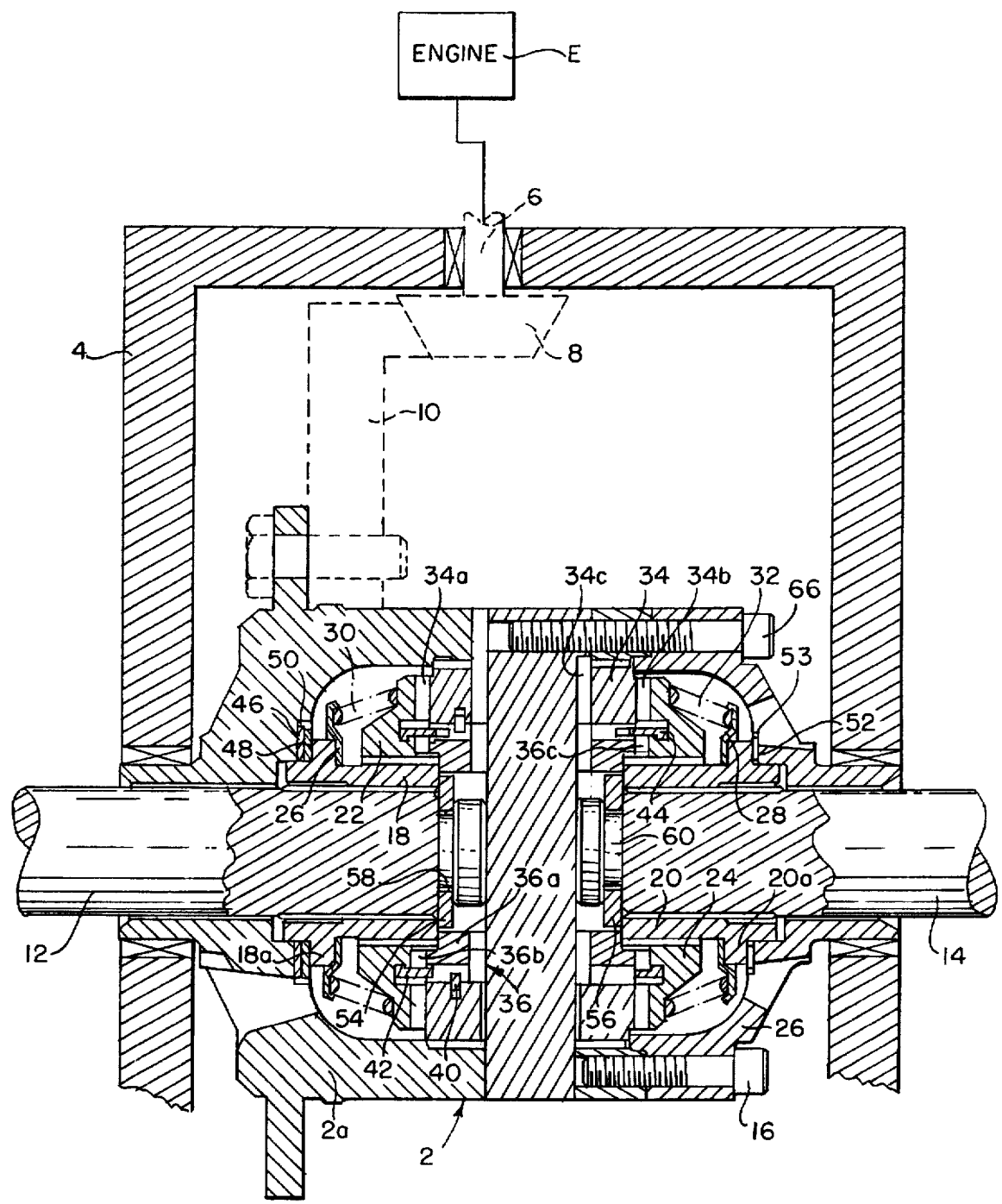

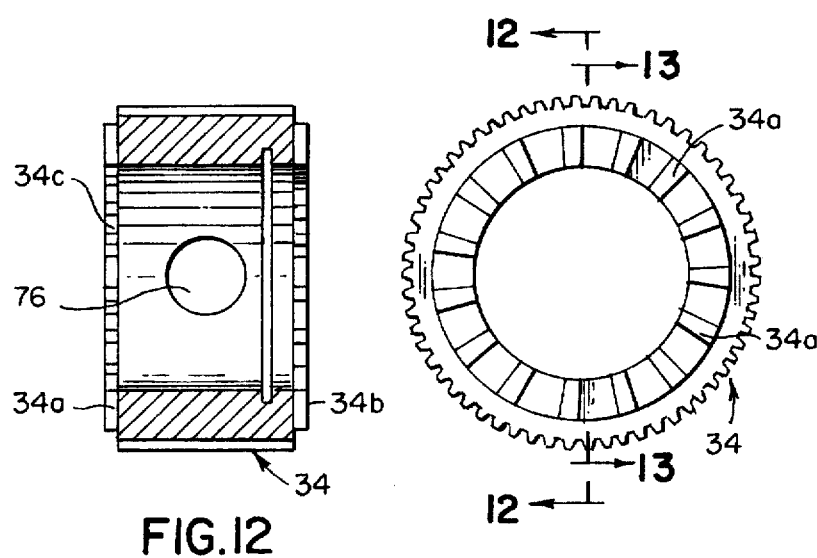
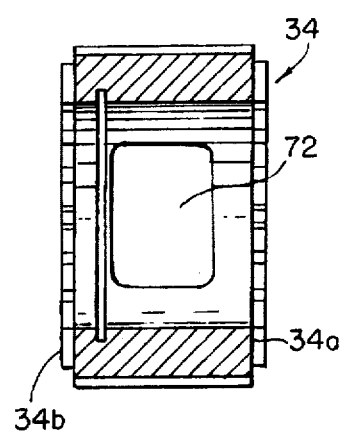
FIG. 12   FIG. 11   FIG. 13
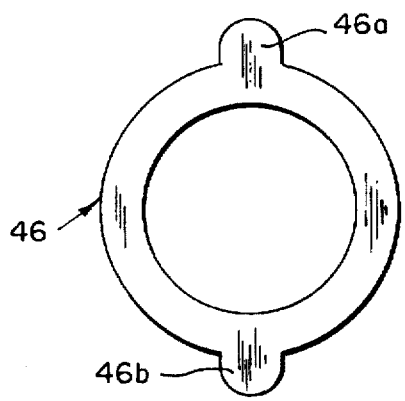
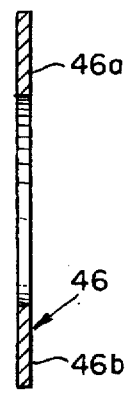
FIG. 14   FIG. 15
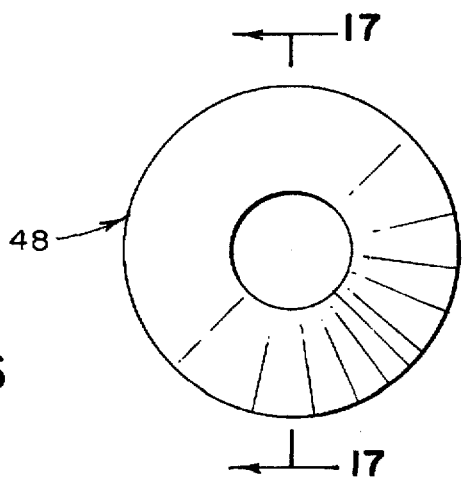
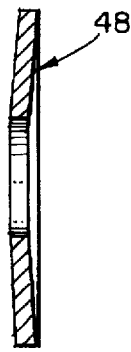
FIG. 16   FIG. 17

LOCKING DIFFERENTIAL WITH PRE-LOAD MEANS AND C-CLIP RETAINERS

BACKGROUND OF THE INVENTION

CROSS-REFERENCES TO RELATED APPLICATIONS

This invention is related to the invention of the inventor's application, Ser. No. 08/508,452 filed Jul. 28, 1995 now U.S. Pat. No. 5,590,572.

FIELD OF THE INVENTION

The present invention relates to an improved locking differential having C-clip retainers for preventing axial separation of the output shafts, characterized by the provision of preload spring means for biasing a pair of side gears axially inwardly toward contiguous engagement with a center cam, thereby to dampen the rotational play between the center cam and a central drive gear.

BRIEF DESCRIPTION OF THE PRIOR ART

Differentials having preload means are known in the patented prior art as shown by the patent to Bawks et al No. 5,221,238 and the co-pending patent application to Dissett Ser. No. 08/374,091, now U.S. Pat. No. 5,524,509 both assigned to the same assignee as the present invention. The Bawks patent discloses a differential of the helical gear type having spring devices which are non-rotatably mounted in the housing for biasing a pair of side gears axially inwardly toward a spacer, thereby to reduce the clearances between the side gears arid the spacer, whereby differential backlash is reduced.

The Dissett patent application discloses a differential of the holdout ring type having resilient means for biasing a pair of side gears axially outwardly into engagement with a pair of annular thrust washers mounted on the interior of the differential housing, thereby to reduce the operating noise level of the differential.

The co-pending application to Valente Ser. No. 08/508,452, also assigned to the same assignee as the present invention, discloses a locking differential for automatically disengaging an overrunning output shaft from the drive mechanism. The differential includes C-clips mounted on the adjacent ends of the output shafts, respectively, thereby to prevent axial separation of the output shafts relative to the differential housing. While this differential operates generally satisfactorily, it suffers from inherent rotational free play between the center cam and the central drive gear.

The present invention was developed to dampen the rotational free-play of the known differentials and, thereby improve the overall operating characteristics of the differential.

SUMMARY OF THE INVENTION

Accordingly, a primary object of the present invention is to provide an improved automatic locking differential of the type having C-clip retainers mounted on the adjacent ends of the output shafts, together with preload means biasing the differential components such that the overall inherent rotational free play between the center cam and the central drive gear is dampened.

According to a more specific object of the invention, the improved differential includes an annular central drive gear, and an annular center cam member arranged concentrically within the central drive gear, the center cam member having an internal shoulder that extends radially inwardly between a pair of side gears, preload means being provided for biasing the side gears inwardly toward engagement with the center cam shoulder. By urging the side gears into axial engagement with the center cam, the rotational play between the center cam and a central drive gear is dampened, and the overall operation of the differential is improved.

A further object of the invention is to provide an improved differential in which the center cam inside diameter serves to retain each C-clip in position about its corresponding output shaft.

It is another object of the invention to provide an improved differential wherein each side gear includes a planar annular abutment surface for engaging both the C-clip retainer mounted on the corresponding output shaft and the annular center cam shoulder.

It is a yet further object of the present invention to provide an improved differential wherein the internal surface of the differential housing contains a pair of counterbores adjacent the remote ends of the side gears for non-rotatably receiving thrust washers therein.

It is still another object of the present invention to provide an improved differential apparatus wherein the preload means include spring means, such as annular spring washers, coils, wave washers or the like, arranged within each counterbore between the thrust washer and the associated side gear.

BRIEF DESCRIPTION OF THE DRAWINGS

Other objects and advantages of the invention will become apparent from a study of the following specification when viewed in light of the accompanying drawings, in which:

FIG. 1 is a longitudinal sectional view of the locking differential of the present invention;

FIG. 3 is a detailed view of the housing taken along line 3—3 of FIG. 2a;

FIG. 11 is an end view of the central drive gear member of FIG. 1;

FIGS. 12 and 13 are longitudinal sectional views of the central drive gear member of FIG. 1;

FIGS. 14 and 15 are end and sectional views, respectively, of one of the thrust washers of FIG. 1;

FIGS. 16 and 17 are end and sectional views, respectively, of one of the spring members of FIG. 1;

DETAILED DESCRIPTION

Figure 2A:
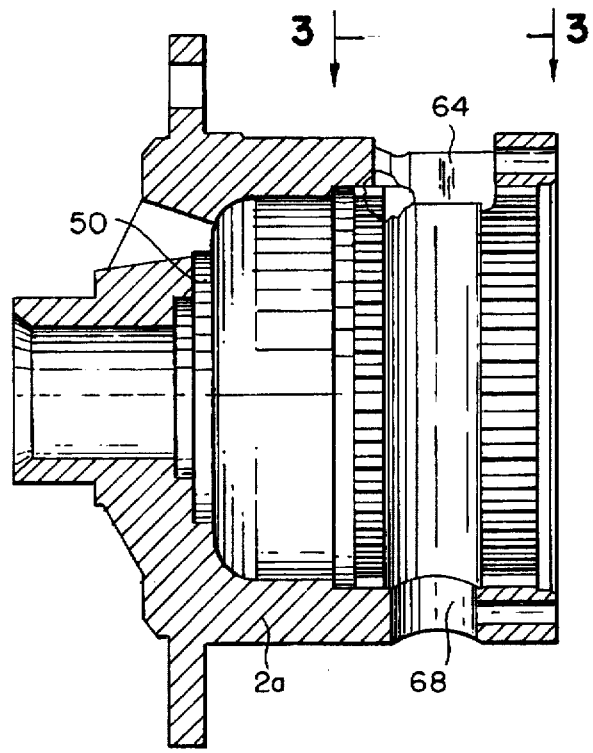
FIGS. 2a and 2b are sectional views of the main body and end cover sections of the differential housing.
Figure 2B:
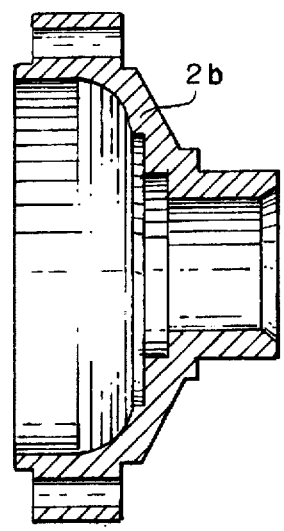

Referring first to FIG. 1, the differential of the present invention includes a housing 2 that is rotatably supported within the differential casing 4 for driven movement by the vehicle engine E via drive shaft 6, pinion 8, and ring gear 10, thereby to drive the aligned output shafts or axles 12 and 14 that are respectively connected with the driven wheels (not shown) of the vehicle. The housing is sectional and includes a main body section 2a and a removable end section 2b that are bolted together by bolts 16.

A pair of side gears 18 and 20 are non-rotatably splined to the output shafts 12 and 14 respectively, and a pair of clutch gear members 22 and 24 are mounted for axial sliding movement concentrically about the side gears 18 and 20, respectively. The side gears 18 and 20 are provided with annular outer collar portions 18a and 20a, respectively, which support spring retainers 26 and 28, respectively. At their remote ends, the side gears extend within first counterbores, respectively, contained within the housing. Spring retainers 26 and 28 in turn, support spring means 30 and 32, respectively, that normally bias clutch members 22 and 24 axially inwardly.

An annular center drive gear member 34 is non-rotatably splined to the housing 2 between the clutch members 22 and 24, which center drive gear member is provided at each end with drive gear teeth 34a and 34b.

Figure 8:
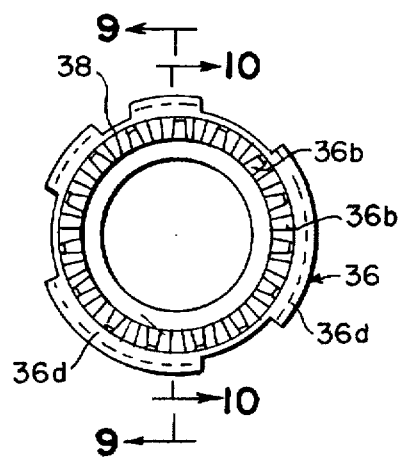
FIG. 8 is an end view of the center cam member of FIG. 1.

An annular center cam member 36 is arranged for limited rotational movement concentrically within the center drive gear member 34 and between the side gears 18 and 20. The center cam member 36 includes an internal central annular support shoulder 36a that extends radially inwardly between, and abuts with, the side gears 18 and 20 and further includes a plurality of cam teeth 36b and 36c at each end. The center cam member 36 is keyed for limited rotational movement relative to the center drive gear member 34 by the cooperation between an internal key 34c (FIGS. 11 and 12) on the inner circumference of the center drive gear member 34, and a corresponding slot 38 (FIG. 8) contained in the outer circumference of the center cam member 36.

Snap ring 40 extends within corresponding grooves contained in the outer and inner circumferential surfaces of the center cam member 36 and the center drive gear member 34, respectively, thereby to prevent relative axial movement between the two members. Conventional holdout rings 42 and 44 are connected with the clutch gears 22 and 24, respectively, thereby to maintain in a disengaged condition that clutch gear 22 or 24 that is associated with an overrunning output shaft 12 or 14, respectively.

In accordance with a characterizing feature of the invention, an annular thrust washer 46 and an annular spring washer 48 are arranged within a second counterbore 50 contained in the housing for reaction between the bottom wall of the counterbore and the outer collar portion 18a of side gear 18. Thrust washer 46 is formed of hardened steel and includes diametrically opposed radially outwardly extending tab portions 46a and 46b that are received within corresponding recesses contained in the counterbore wall, thereby to prevent rotation of the thrust washers relative to the housing 2. The spring washer 48, which may be, for example, a Belleville-type spring washer, serves to bias the side gears axially together toward engagement with the center cam support shoulder 36a, thereby dampening the rotational play between the center cam 36 and the center drive gear 34. To accommodate the addition wear resulting from the axial load, a second thrust washer 52 is contained in a counterbore 53 provided between the inner surface of the housing and the outer collar portion 20a of side gear 20.

A pair of C-clips 54 and 56 are received in grooves 58 and 60, respectively, contained in the periphery of the ends of the output shafts 12 and 14, respectively. The C-clips abut the adjacent ends of side gears 18 and 20, respectively, thereby to prevent axial separation of the output shafts 12 and 14. The C-clips are retained in the corresponding grooves by the center cam support shoulder 36a.

Figure 3:
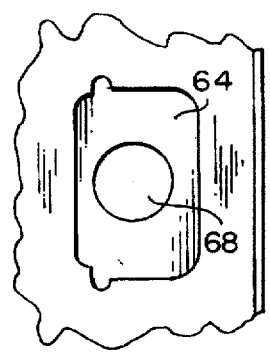
Figure 4:
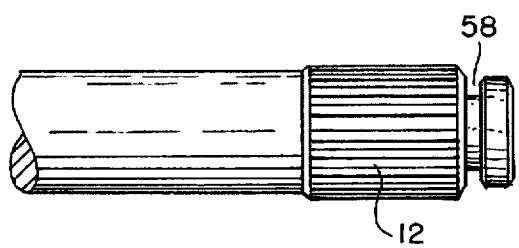
FIG. 4 is a detailed elevational view of the grooved end of one of the output shafts of FIG. 1.
Figure 5:
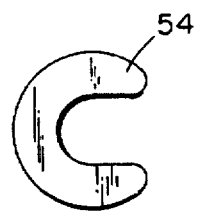
FIG. 5 is an elevational view of one of the C-clip retainers of FIG. 1.
Figure 6:
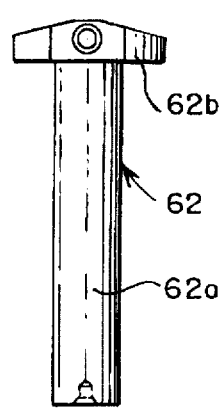
FIG. 6 is a longitudinal side view of the spacer pin of the differential of FIG. 1.
Figure 7:
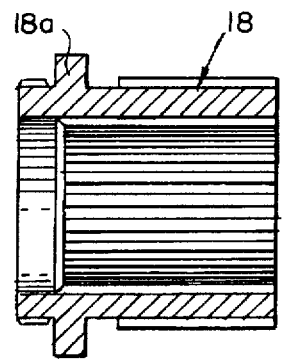
FIG. 7 is a longitudinal sectional view of one of the side gears of FIG. 1.

A spacer pin 62 extends diametrically across the housing chamber between output shafts 12 and 14 to prevent the shafts from being axially displaced toward each other. The spacer pin includes a body portion 62a (FIG. 6) that is abutted by the adjacent ends of the output shafts 12 and 14, and an enlarged head portion 62b that is received within a corresponding access opening 64 (FIG. 3) contained in the body section 2a. The spacer pin may be either cylindrical or may include remote parallel flat surfaces, if desired. A bolt 66 serves to releasably maintain the spacer pin in connected relation relative to the housing 2. At its other end, the cylindrical body portion 62a extends within a corresponding through bore 68 contained in the housing body section 2a.

Figure 9:
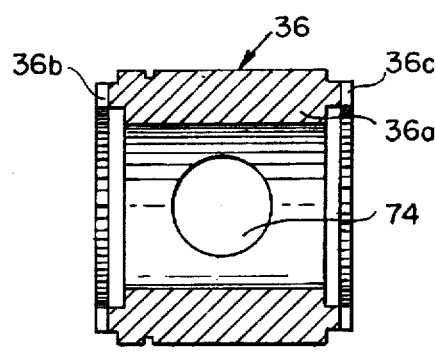
FIGS. 9 and 10 are longitudinal sectional views of the center cam member of FIG. 1.
Figure 10:
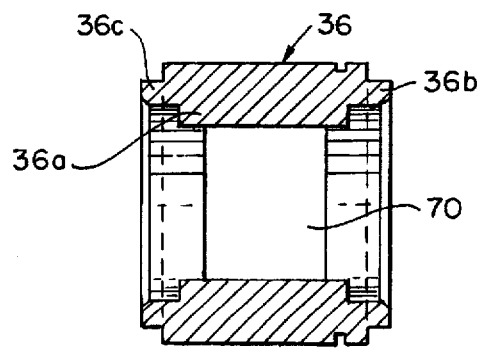

In addition to the housing access opening 64, in order to provide access to the C-clips 54 and 56 when the spacer pin 62 is removed from the differential, a pair of aligned radially-arranged access windows 70 (FIG. 10) and 72 (FIG. 13) are provided in the center cam member 36 and the center drive gear member 34, respectively. Diametrically arranged in these members opposite the access windows are through bores 74 (FIG. 9) and 76 (FIG. 12) that receive the body portion 62a of the spacer pin. The center drive gear member is connected with the housing such that access window 72 is opposite housing access opening 64, and the access windows 72 and 70 are maintained generally opposite each other by the cooperation between internal locator key 34c on the center drive gear member 34, and slot 38 on the outer periphery of the center cam member.

To connect the output shafts 12 and 14 to an assembled differential mechanism, the bolt 66 is removed to permit removal of the spacer pin 62 from the housing, whereupon the output shaft 12 is axially introduced into the differential within side gear 18 until the groove 58 is exposed in the aligned access windows 70 and 72 contained in the center cam and center drive gear member, respectively. C-clip 54 is introduced into the housing chamber via openings 64, 70, and 72 and is inserted within the groove 58. The axle 12 is then axially displaced to the left to cause the C-clip 54 to be contained within the center cam inside diameter 36a, thereby to retain the C-clip within the groove 58, and to prevent axial displacement to the left of the axle 12. Similarly, the axle 14 may then be inserted axially into the differential mechanism until the groove 60 is exposed in the windows 64, 70, and 72, whereupon the second C-clip 56 is inserted within the groove 60 provided in the outer periphery of the output axle 14. The axle 14 is then shifted to the right to introduce C-clip 56 within the center cam inside diameter 36a, thereby to retain the C-clip in the groove 60. Once the C-clips 54 and 56 are installed on shafts 12 and 14, respectively, the spacer pin 62 is re-inserted between the shafts and bolt 66 is re-inserted to lock the spacer pin in position. Bolts 16 are then tightened to load spring 48, thereby causing spring 48 to abut and inwardly bias side gear 18 which abuts center cam shoulder 36a and C-clip 54. Center cam shoulder 36a similarly transmits the compressive force to side gear 20 which bears against the opposite side of the housing via thrust washer 52. This pre-load serves to dampen the inherent rotational free play between the center cam 36 and the center drive gear member 34.

Operation

The assembled differential operates in a conventional manner. Assume, for example, that the rotational velocity of the output shaft 12 overruns that of the output shaft 14 beyond a predetermined amount. In this case, the cam teeth 36b on the center cam member 36 shift clutch member 22 to the left, thereby to effect disengagement between the clutch teeth 34a and the corresponding driving teeth 34a on the center drive gear member 34. The holdout ring 42 is slightly angularly displaced to a holdout position in which the axial tabs thereon engage the outer flange portions 36d (FIG. 8) of the center cam member, thereby to maintain the clutch member 22 in its disengaged condition. When the overrunning condition is terminated, the holdout ring is angularly returned to its initial position, whereupon owing to the biasing force of spring means 30, the clutch member 22 is returned into engagement with the center drive gear member 34. A similar differential operation occurs in the event that the right hand output shaft 14 overruns the left hand shaft 12 by a predetermined amount.

Figure 18:
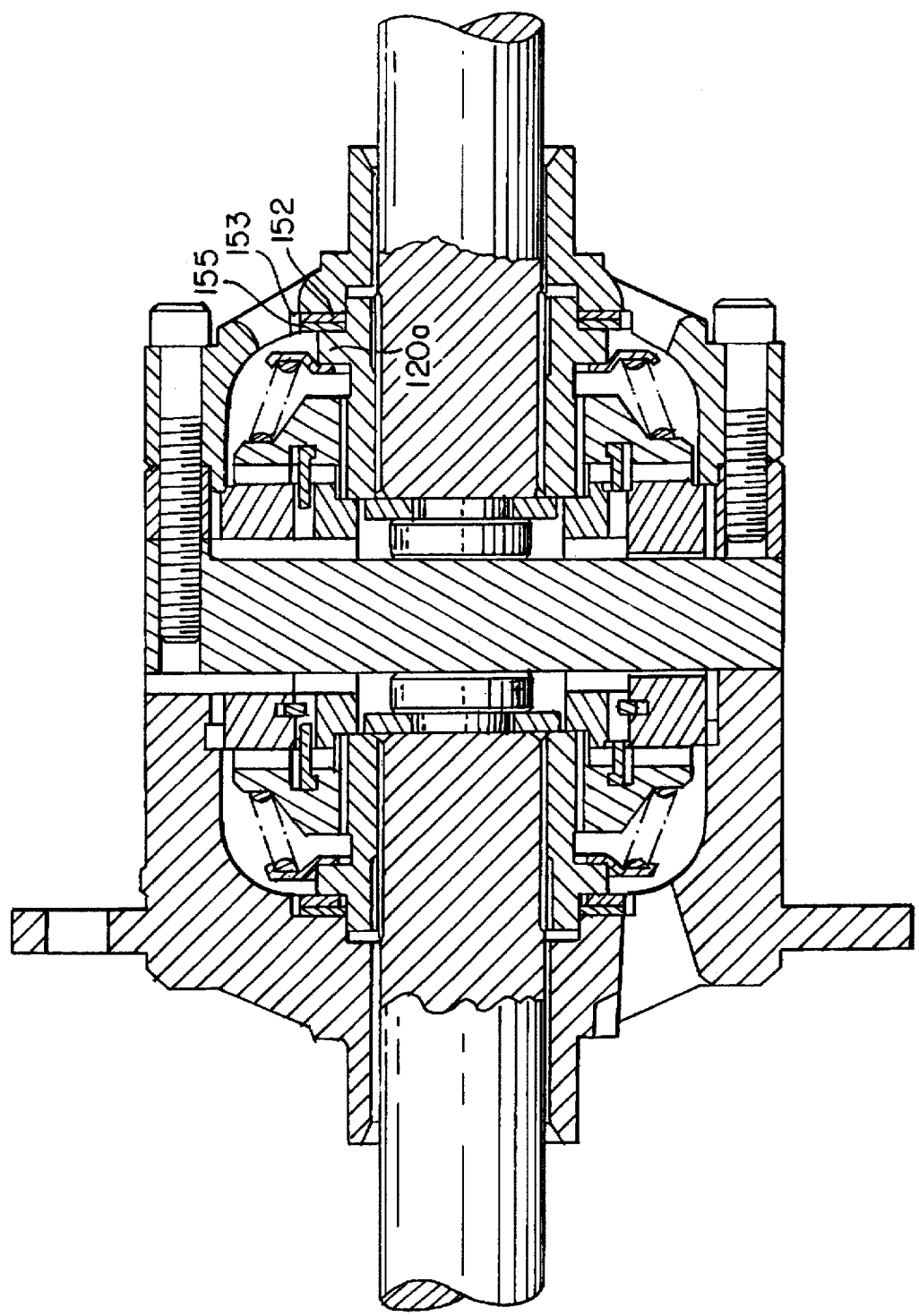
FIG. 18 is a longitudinal sectional view of a second embodiment of the invention.

Referring now to the modification of FIG. 18, in this embodiment, a second Belleville-type spring washer 155 similar to spring 48 is provided between side gear shoulder 120a and thrust washer 152. In order to accommodate spring 155 and thrust washer 152, the depth of counterbore 153 is increased to the size of second counterbore 50. The remaining differential structure is identical to that of FIG. 1.

While in accordance with the provisions of the Patent Statutes the preferred forms and embodiments of the invention have been illustrated and described, it will be apparent to those of ordinary skill in the art that various changes and modifications may be made without deviating from the inventive concept set forth above.

What is claimed is:

1. A differential apparatus of the automatic lock-out type for driving from an input shaft a pair of colinearly-arranged axially-spaced output shafts having adjacent ends which contain peripheral grooves, respectively, comprising:

(a) a housing having a longitudinal axis, said housing being adapted for rotation about said longitudinal axis by the input shaft, said housing containing an internal chamber, and a pair of opposed openings colinear with said longitudinal axis and in communication with said chamber for rotatably receiving the adjacent ends of the output shafts, respectively;

(b) a pair of annular side gears arranged within said housing chamber adjacent and colinear with said openings, respectively, said side gears being adapted for non-rotatable splined connection with said output shafts, respectively;

(c) a pair of annular clutch gear members arranged concentrically about, and splined for axial displacement relative to, said side gears, respectively;

(d) annular center driver gear means colinearly arranged between said clutch gears, said center driver gear means being non-rotatably connected with said housing;

(e) clutch spring means normally biasing said clutch gear members together toward engaged positions relative to said center driver gear means;

(f) annular center cam means arranged concentrically within said center driver gear means for disengaging one of said clutch gears from said center driver gear means when the associated output shaft overruns the other output shaft by a predetermined amount, said center cam means having an internal central annular support shoulder that extends radially inwardly between, and in abutting engagement with, said side gears, respectively, thereby to limit the axial displacement of said side gears toward each other;

(g) annular holdout ring means arranged concentrically relative to said center cam means for maintaining said one clutch gear in the disengaged condition relative to said center driver gear means as long as the overrunning condition exists;

(h) spacer means removably connected with said housing for preventing axial displacement of said output shafts toward each other;

(i) said housing, said center drive gear means and said center cam means containing aligned radially-extending access openings;

(j) a pair of colinearly arranged C-clips arranged concentrically within said center cam support shoulder opposite said access openings, said C-clips being in abutting engagement with the adjacent side gears, respectively, said C-clips being adapted for insertion within the peripheral grooves contained in said output shafts, respectively, thereby to limit the extent of axial separation of the output shafts; and (k) resilient preload means for biasing said side gears into axial engagement with said center cam support shoulder, thereby to dampen the rotational play between said center cam means and said center driver gear means.

2. Apparatus as defined in claim 1, wherein said housing contains at least one internal counterbore arranged concentrically about one of said housing openings, and further wherein said preload means is annular and is arranged concentrically within said counterbore.

3. Apparatus as defined in claim 2, and further including an annular thrust washer arranged within said counterbore between said preload means and said housing.

4. Apparatus as defined in claim 3, wherein said preload means includes a Belleville-type spring washer.

5. Apparatus as defined in claim 4, wherein the side gear adjacent said one housing opening has an external annular collar; and further wherein said thrust washer and said Belleville-type spring washer are arranged concentrically about said side gear intermediate said side gear collar and said housing.

6. Apparatus as defined in claim 1, wherein said preload means includes a pair of annular resilient means arranged colinearly between said side gears and said housing, respectively.

7. Apparatus as defined in claim 6, wherein said side gears have external annular collars; and further wherein said housing openings are internally counterbored to define counterbores, said resilient means being arranged within said counterbores concentrically about said side gears in engagement with said side gear collars, respectively.

8. Apparatus as defined in claim 7, wherein said housing openings contain second counterbores; and further wherein said side gears have remote end portions extending within said second counterbores, respectively.

* * * * *